(12) United States Patent
Rychener et al.

(10) Patent No.: US 9,802,784 B2
(45) Date of Patent: Oct. 31, 2017

(54) DEVICES FOR GUIDING AND CONVEYING WIRE-SHAPED OR STRAND-SHAPED PRODUCTS

(71) Applicant: SCHLEUNIGER HOLDING AG, Thun (CH)

(72) Inventors: Joerg Rychener, Steffisburg (CH); Marcel Luethi, Zaeziwil (CH); Roger Steuri, Thun (CH)

(73) Assignee: Schleuniger Holding AG, Thun (CH)

( * ) Notice: Subject to any disclaimer, the term of this patent is extended or adjusted under 35 U.S.C. 154(b) by 81 days.

(21) Appl. No.: 15/131,086

(22) Filed: Apr. 18, 2016

(65) Prior Publication Data

US 2016/0308336 A1    Oct. 20, 2016

(30) Foreign Application Priority Data

Apr. 17, 2015  (EP) .................................... 15164104

(51) Int. Cl.
*B65H 51/10* (2006.01)
*B65H 51/14* (2006.01)
*H02G 1/12* (2006.01)

(52) U.S. Cl.
CPC .............. *B65H 51/10* (2013.01); *B65H 51/14* (2013.01); *B65H 2701/34* (2013.01); *B65H 2701/36* (2013.01); *H02G 1/12* (2013.01); *H02G 1/1248* (2013.01)

(58) Field of Classification Search
CPC ........ B65H 51/04; B65H 51/06; B65H 51/08; B65H 51/10; B65H 51/105; B65H 51/14; B65H 2701/34; B65H 2701/36; B65H 2404/1421; B65H 2404/14211; B65H 2404/2613; B65H 2404/2615; H02G 1/12; B65G 13/065; B65G 13/04
See application file for complete search history.

(56) References Cited

U.S. PATENT DOCUMENTS

| 4,089,405 | A | 5/1978 | Loomis et al. |
| 4,275,619 | A | 6/1981 | Shimizu |
| 8,234,772 | B2 | 8/2012 | Locher et al. |
| 2001/0023884 | A1 | 9/2001 | Hasegawa et al. |

FOREIGN PATENT DOCUMENTS

| GB | 1562096 A | 3/1980 |
| JP | 2003-087923 A | 3/2003 |
| WO | 97/17751 A1 | 5/1997 |

OTHER PUBLICATIONS

EPO search report and written opinion from priority EPO application EP15164104, dated Oct. 2, 2015, in German.

*Primary Examiner* — Michael C McCullough
(74) *Attorney, Agent, or Firm* — Davis & Bujold PLLC; Michael J. Bujold

(57) ABSTRACT

Devices for guiding and conveying wire- or strand-shaped products, for example a cable (K) in a cable processing system, such as a cable stripping system. Provided here is at least one pair of transport devices (1*a*, 1*b*, 4*a*, 4*b*, 5*a*, 5*b*, 6*a*, 6*b*, 7*a*, 7*b*). At least one of the small secondary rollers (4*a*, 4*b*, 36) may be adjusted between at least one position in the conveying direction before the point of contact of the respective accompanying primary roller (1*a*, 1*b*, 30) with the product (K) and at least one second position in the conveying direction behind the point of contact of the primary roller (1*a*, 1*b*, 30) with the product (K).

20 Claims, 4 Drawing Sheets

FIG. 6B   FIG. 6C   FIG. 6D

DEVICES FOR GUIDING AND CONVEYING WIRE-SHAPED OR STRAND-SHAPED PRODUCTS

This application claims benefit of priority to prior European (EPO) application no. EP15164104 filed on Apr. 17, 2015 and the entirety of prior European application no. EP15164104 is hereby expressly incorporated herein by reference, in its entirety and as to all its parts, for all intents and purposes, as if set forth identically in full herein.

TECHNICAL FIELD

The present disclosure relates to devices for guiding and conveying wire- or strand-shaped products as transport drives, for example a cable in cable processing systems, in particular cable stripping systems; as well as to cable processing systems, in particular cable stripping systems or cable cutting machines, having at least one cable processing device and at least one device for guiding and conveying the cable.

BACKGROUND

Apart from the actual processing devices, transport drives are very important assemblies of cable processing systems, for example of automatic cable stripping machines. Their job is to transport the cable, position it in an axially precise manner for processing, also if necessary exert a force on the cable during processing, as well as grip and catch the cable after processing and transport it away from the area of the processing system. The first two tasks, specifically transport and positioning, may be handled by rollers or belts with enough resolution. The third job of transferring force requires that the motors and transmissions be correspondingly configured, as well as that suitable materials and surfaces be selected for the roller and belt material.

Finally, the last task of guiding is resolved in most configurations of machines or systems for processing wire- or strand-shaped products with a guide at the outlet of the processing device, which guide guides the cable into the following drive with rollers or belts (see FIG. 1 and FIG. 3). This yields a shortest possible cable length (length L, FIG. 1), since the cable with its insulation must be situated between the rollers or belts before it is cut, for example, and so that it can then be transported further. If an outlet is also provided for the cable at the second cable end, the minimal cable length then again becomes longer at the second cable end by this outlet length. The shortest cable length is thus the sum of the distance between the boundary of the processing axis of the processing device and the axis of the roller, or between the guide roller of the belt drive facing the processing device and the stripping lengths of both the two cable ends.

However, there are applications that in practice require much shorter cable lengths. To this end, it was proposed that the outlet side guide be omitted, and smaller rollers be placed in this location. These smaller rollers are operated together with the larger rollers, wherein the rollers jointly preferably carry a toothed belt or the like (see FIG. 2). The shortest possible cable length is derived from the same conditions as explained above, wherein the closer position of the smaller rollers to the processing device and the smaller roller diameters per se enable a significant shortening of the minimum cable lengths. Kits (so-called short-mode kits) are used for such short cable lengths to upgrade conventional drives.

However, the respectively prescribed drive concept—rollers or belts—must be retained for each individual processing device for wire- or strand-shaped products, and cannot be altered. Only using the short-mode kit offers an adjustment option, specifically to operation with or without the latter.

SUMMARY

Therefore, it is an object within the scope of the present disclosure to find a drive solution that can cover all three known concepts.

The starting point is here a device that encompasses at least one pair of opposing transport devices, which define a guide gap for the product, and which exhibit a respective at least one guiding and conveying element frictionally interacting with the cable and/or at least one large primary roller and at least one smaller secondary roller, wherein the guide gap is defined by at least the large primary rollers lying opposite each other.

Such a device for achieving the set object is characterized by the fact that at least one of the small secondary rollers, preferably both secondary rollers lying opposite each other in relation to the guide gap, may be adjusted between at least one position in the conveying direction before the point of contact of the respective accompanying primary roller with the product and at least one second position in the conveying direction behind the point of contact of the primary roller with the product, both positions being in contact with the product. This feature yields a flexible construction that may be modified depending on the application, and which can quickly and uncomplicatedly cover the two configurations of a conventional belt drive and of a short-mode drive with simple conversion steps.

It is further preferred that at least one of the small secondary rollers be adjustable into a position lifted away from the product, so as to thereby yield a single roller drive, even given a configuration with slipped on driving belt, which in this position of the small secondary roller only acts as a "coating" of the large primary roller. Both secondary rollers lying opposite each other in relation to the guide gap can preferably be adjusted in this way, so as to ensure a complete conversion to roller drive. This yields a flexibility in applications, in particular to include short-mode and belt drive, resulting from a flexible cable transport drive that can cover the three configurations usual in practice (roller drive, belt drive, short-mode drive) in a single solution via simple and quick modification.

In order to obtain the best possible flexibility, the secondary rollers may preferably be adjustable independently of each other on different sides of the guide gap.

Another advantageous version is characterized in that at least one secondary roller is mounted on a support, which support may be fixed in discrete positions or locations in relation to the respective primary roller, and be varied between these positions or locations. As a result, precisely definable positions can be prescribed for a simple and precisely reproducible conversion, which can be set quickly and, if needed, also automated.

A first variant here provides that at least one secondary roller be eccentrically mounted, preferably at one end, on an oblong support element, wherein this support element in relation to the respective primary roller can be fixed in at least two orientations lying opposite each other and parallel to the guide gap relative to the longitudinal direction. This configuration permits a quick modification of the guide or drive for the strand- or wire-shaped product from a conventional drive to a drive corresponding to a short-mode kit.

In order to precisely prescribe the guide gap and have reproducible precision in each modification process, it is advantageous for the support element to interact at least with a guide on the device running parallel to the guide gap, for example to be inserted into a groove.

Another variant can provide that at least one secondary roller be eccentrically mounted, preferably at one end, on an oblong support element, wherein this support element can be pivoted around a rotational axis lying parallel to the axis of the primary roller and fixed in at least two positions. Therefore, the support element can preferably be pivoted in a rotational axis that is identical to the axis of the primary roller or preferably lies coaxially. This configuration enables a modification between various drive variants without having to disassemble the primary roller, since the secondary roller can be simply pivoted around the primary roller.

An especially advantageous version is characterized by the fact that the support element is mounted on a disk, which disk can be rotated around an axis lying coaxial to the axis of the primary roller and fixed in at least two positions. In this version, the secondary roller can be pivoted around the primary roller into whatever position desired, and fixed in these positions as deemed necessary owing to the circumstances surrounding the machine itself or the processing procedure.

In order to be able to adjust the device to products varying in diameter or cross section, an advantageous version provides that at least the transport device arranged on one side of the guide gap be situated on a support plate. The support plate can be adjusted to reduce and/or enlarge the guide gap relative to the opposing transport device. This adjustment preferably takes place radially or laterally to the progression of the guide gap, and in a plane containing the guide gap.

The object set at the outset may also for achieved for a cable processing system, in particular a cable stripping system or cable cutting machine, with at least one cable processing device and at least one device for guiding and conveying the cable, by having at least one of the devices be designed according to one of the above paragraphs.

In a version characterized by the fact that at least one device according to one of the above paragraphs is located upstream, and a similar type of device downstream, from the cable processing device, the transport of products on both sides of the actual processing device may be flexibly adjusted to the respective optimal configuration. In particular, secondary rollers facing the processing device of this device on both sides may be used to guide or transport the shortest cable lengths, and hence to also process the latter.

The highest possible flexibility may be achieved in a variant in which the secondary rollers of the devices arranged on opposite sides of the cable processing device may be adjusted independently of each other.

Additional advantages, features and details of the invention may be gleaned from the following description, in which exemplary versions of the invention are described with reference to the drawings. The features mentioned in the disclosure may possibly also be viewed as inventive whether considered in isolation or in any combination.

BRIEF DESCRIPTION OF THE DRAWINGS

The appended list of reference labels comprises an integral part of the present disclosure. The drawing figures are described in a coherent and comprehensive manner, where the same reference numbers denote the same components, while reference numbers with varying indices indicate functionally identical or similar components. Shown here in.

DETAILED DESCRIPTION

In the present description, numerous specific details are set forth in order to provide a thorough understanding of exemplary versions of the present invention. It shall be apparent, however, to one skilled in the art, that some versions of the present invention may be practiced without some of these specific details. Indeed, reference in this specification to "one version," "a/the version," "a/the variant," and "one variant," should be understood to mean that a particular feature, structure, or characteristic described in connection with the version or variant is included in at least one such version or variant of the disclosure. Thus, the appearances of phrases "in one version," "in one variant," and the like in various places in the specification are not necessarily all referring to the same variant or version, nor are separate or alternative versions or variants mutually exclusive of other versions or variants. Moreover, various features are described which may be exhibited by some versions or variants and not by others. Similarly, various requirements are described which may be requirements for some versions or variants but not others. Furthermore, as used throughout this specification, the terms 'a', 'an', 'at least' do not denote a limitation of quantity, but rather denote the presence of at least one of the referenced item in the sense that singular reference of an element does not necessarily exclude the plural reference of such elements. Concurrently, the term "a plurality" denotes the presence of more than one referenced items. Finally, the terms "connected" or "coupled" and related terms are used in an operational sense and may not necessarily be limited to a direct connection or coupling.

Figure 1:
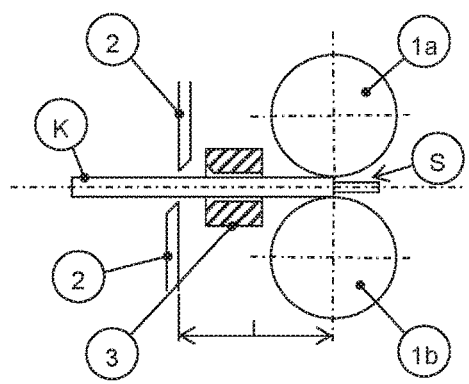
FIG. 1 is a schematic depiction of a first variant of a known cable transport device in a roller design.

FIG. 1 presents an illustration of a known cable transport device of one side of a machine for stripping cables. Two large rollers 1a, 1b are arranged opposite each other, and, between their circumferential sections lying adjacent to the respective other roller, define a guide gap S for the cable K to be processed. For example, the actual processing device presents two opposing blades 2, which can cut the insulation of the cable K and strip it from the cable K when the rollers 1a, 1b move the cable K accordingly. In addition, a socket-shaped guide 3 for the cable section between the processing device 2 and the rollers 1a, 1b may be provided between the blades 2 and the guide and transport rollers 1a, 1b.

Figure 2:
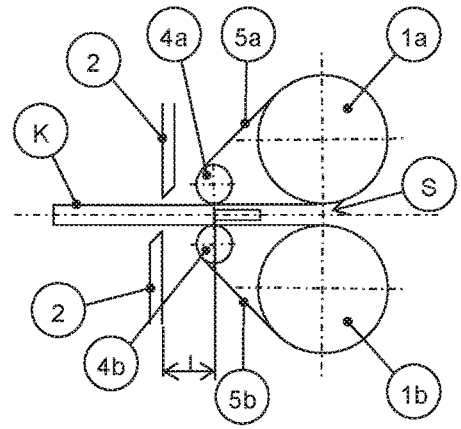
FIG. 2 is a schematic depiction of a second known design of a cable transport device in the form of a short-mode kit.

In FIG. 2, fixedly secured secondary rollers 4a, 4b are provided in the depicted previously-known version of a guide and transport device in the form of a short-mode kit. These secondary rollers 4a, 4b and the large primary rollers 1a, 1b tension a respective belt 5a, 5b as a guide and force transfer element. The secondary rollers 4a, 4b and the sections of the belt 5a, 5b extending up to the large primary rollers 1a, 1b replace the guide 3 of FIG. 1 in the short-mode kit of FIG. 2.

Figure 3:
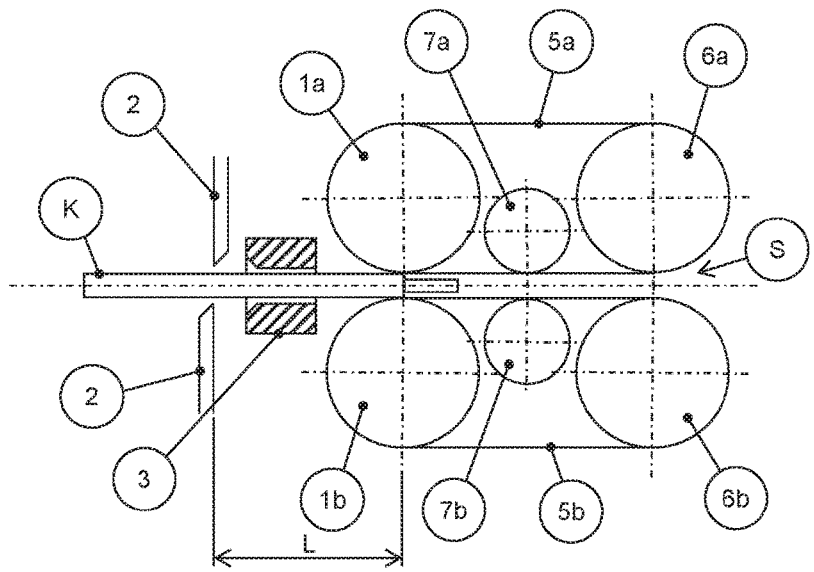
FIG. 3 is an image of a conventional belt drive for cables.

FIG. 3 depicts another variant for previously known transport devices in cable processing systems. A belt 5a, 5b is tensioned by two essentially equally large roller pairs 1a, 6a and 1b, 6b wherein the belt sections facing each other define the guide gap S for the cable K. If necessary, an additional pinch roller 7a, 7b can also be provided for the belt 5a, 5b between the rollers 1a, 6a or 1b, 6b of each side of this known guide and transport device.

While the roller and belt configurations of previously-known devices are fixedly prescribed, as in FIGS. 1-3, the proposal according to the present disclosure allows for adjusting at least one of the small secondary rollers 4a, 4b between at least one position in the conveying direction before the point of contact of the primary roller 1a, 1b with the cable K, and at least one second position in the conveying direction behind the point of contact of the primary roller 1a, 1b with the cable K. In both positions, the small secondary roller 4a, 4b is also in engagement with the cable via the belts 5a and 5b. Both secondary rollers 4a, 4b are preferably adjusted in the same manner. These adjustable secondary rollers 4a, 4b may be used to easily and quickly switch between the four configurations depicted in FIG. 4, in particular if they can be completely disassembled and the primary rollers 1a and 1b are replaced by other, preferably coated rollers.

Figure 4:
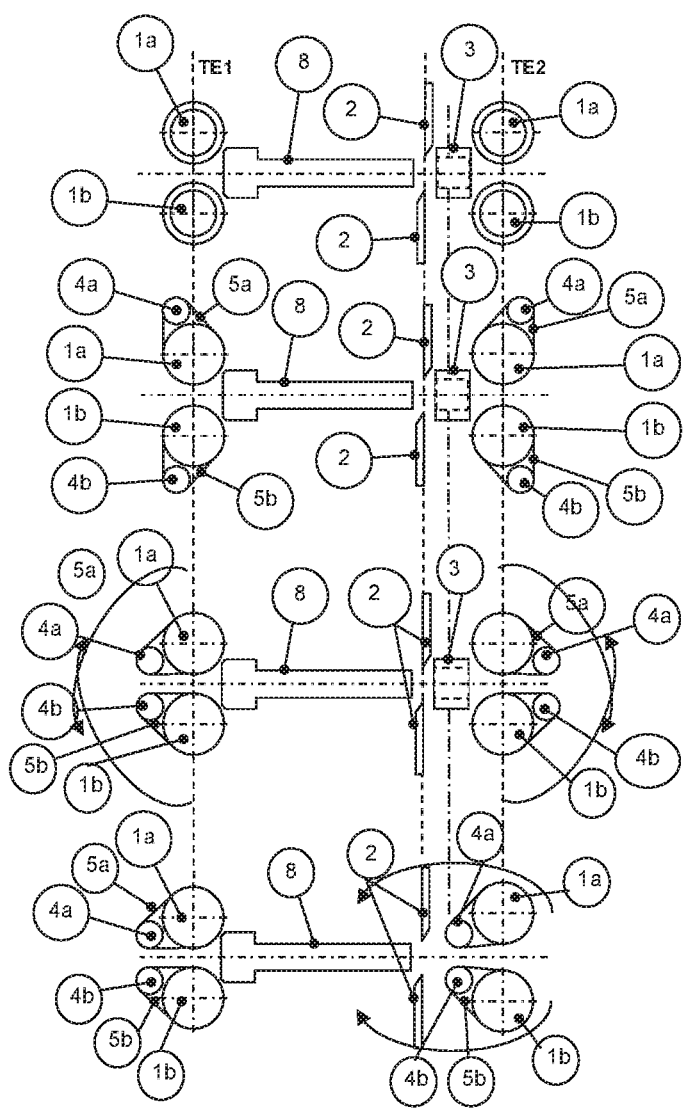
FIG. 4 is a schematic view of the various configurations that are possible with an exemplary device according to the present disclosure for guiding and conveying cable- and strand-shaped products.

The uppermost configuration on FIG. 4 exhibits no secondary rollers 4a, 4b, and thus corresponds to a machine with pure roller drives, for example as shown on FIG. 1. The large primary rollers 1a, 1b preferably at both the inlet and outlet of the actual processing device, which here encompasses a guide tube 8, if necessary one that can pivot, and two blades 2, for example, can advantageously be provided with friction-enhancing surfaces or coatings, so that the cable K can be reliably guided, and the transport and holding forces can be transferred.

A configuration corresponding to the uppermost configuration of a pure roller drive can also be realized given the presence of small secondary rollers 4a, 4b and belts 5a, 5b as contact elements for the cable K, provided these secondary rollers 4a, 4b can advantageously be adjusted in a position lifted away from the cable K, as may be gleaned from the second line of FIG. 4. In any case, it may be necessary and advantageous in all described configurations to adjust only a respective one of the small secondary rollers 4a, 4b on one side of the guide gap S, to which end it must be possible to adjust the secondary rollers 4a, 4b independently from each other on different sides of the guide gap S.

The third configuration, in which an exemplary device according to the present disclosure may be quickly and easily modified by the adjustable small rollers 4a, 4b as depicted in FIG. 4, also includes a respective belt 5a, 5b that runs over the large rollers 1a, 1b and the small rollers 4a, 4b, including a belt drive. Since the large rollers 1a, 1b in both this and the second line version according to FIG. 4 cannot grip the cable K directly adjacent to the guide tube 8 and/or blades 2 owing to the relatively large diameter, a guide sleeve 3 is here interspersed between the processing device 8, 2 and the guide and transport device 1a, 4a, 5a, 1b, 4b, 5b based on the known solutions as depicted on FIG. 1 or FIG. 3, for example.

The bottom line on FIG. 4 depicts a configuration implemented as a kind of short-mode kit. Immediately after the blades 2, the cable K is here gripped, guided and also frictionally transported or fixed between the small secondary rollers 4a, 4b and the subsequent sections of the belt 5a, 5b. This eliminates the need for the guide sleeve 3. The guide and transport device can remain in the configuration designed as a conventional roller or belt drive on the side of the processing device 2, 8 opposite the blades 2.

Of the four configurations shown, the two uppermost variants are identical other than differing from the point of view of the cable K, in that the rollers can vary in the uppermost configuration; while in the second configuration the cable guide and transport device includes the large primary roller 1a, 1b and the belt 5a, 5b that actually comes into contact with the cable K in an arrangement that functionally acts as a roller.

Depending on the application, various types of roller configurations are encountered in practice, specifically rubber rollers with a varying Shore hardness, knurled steel rollers and diamond-coated rollers. The background of these variants involves static friction, which is essential in configurations of the kind shown in the uppermost exemplary version on FIG. 4 for transferring force to the cable K during transport. The possible disadvantage here is that the roller may have to be changed for different requirements.

In contrast, the bottom three (lines) configurations are tied to the material of the belt 5a, 5b, even though various belt coatings are also possible. The major advantage to the bottom three configurations is that the guide and transport device 1a, 4a, 5a, 1b, 4b, 5b may be modified between these configurations without any great outlay, because the small secondary rollers 4a, 4b may be varyingly positioned and fixed between the depicted positions around the large primary rollers 1a, 1b, in terms of their location in relation to the primary rollers. For example, this can be done by pivoting the small secondary rollers 4a, 4b respectively around a respective pivot axis lying parallel to the respective axis of the respective large primary rollers 1a, 1b. The pivot axis may also coincide with the axis of the respective primary roller 1a, 1b.

The bottom two configurations on FIG. 4 cover the situation of a conventional belt drive (as shown on FIG. 3 based on prior art). Essential here are two contact points that directly transfer force (one on the tangent of the large primary roller 1a, 1b, and another on the tangent of the small secondary roller 4a, 4b). The section of the belt 5a, 5b lying in between guides the cable K between the respective contact points with the rollers 1a, 1b, 4a, 4b, and in particular also prevents thin, limp cables from being able to get caught between the contact points or the rollers 1a, 1b, 4a, 4b.

In the sketch of the third configuration in FIG. 4, the small secondary rollers 4a, 4b for the left transport unit are arranged on the left side of the large primary rollers 1a, 1b. Of course, the small secondary rollers 4a,4b could here also be situated on the right side of the large primary rollers 1a, 1b. To this end, the axis of these large rollers 1a, 1b may correspondingly be shifted to the left, so that the small rollers 4a, 4b do not collide with the guide tube 8 that can preferably pivot around an axis near the left transport and guide device or with a guide element that can be shifted as a whole out of the cable axis K.

In the right guide and transport unit, the small secondary rollers 4a, 4b in the third configuration on FIG. 4 are always situated on the right side of the large primary rollers 1a, 1b as a belt drive with guide tube 3 at the outlet of the processing device 2, 8. This arrangement ensures free space for conversion into the bottom configuration on FIG. 4, disassembling the guide 3 and adjusting or converting the small rollers 4a, 4b as depicted to a position as close as possible to the processing device, for example the blades 2.

However, the left and right guide and transport units are advantageously not necessarily identical. With the exception of the top roller drive configuration, the device on the left on FIG. 4 that faces away from the blades 2 of the processing device 2, 8, is preferably always integrated or correspondingly adapted into the configuration with the small secondary rollers 4a, 4b facing away from the processing device 2, 8. By contrast, the right guide and transport device is always modified into one of the three lower configurations, depending on the requirements.

Figure 5A:
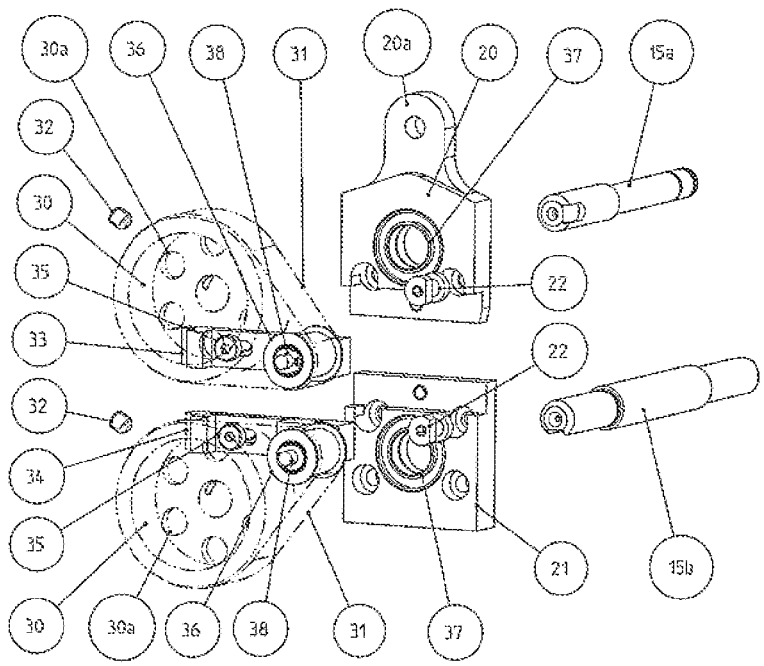
FIG. 5A is an exploded view of a first exemplary version of a cable transport device in a first configuration.
Figure 5B:
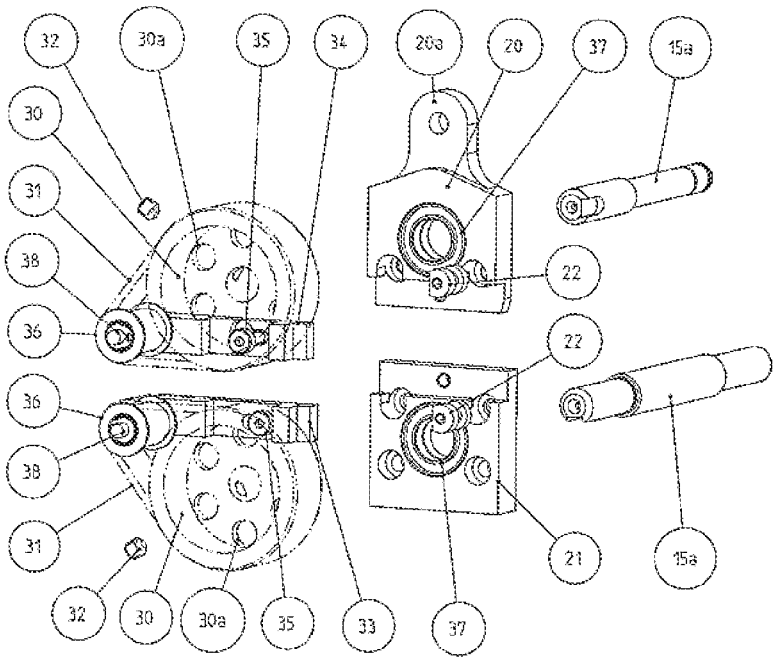
FIG. 5B is an exploded view of the cable transport device of FIG. 5A in a second configuration.

FIGS. 5A and 5B present a version of a guide and transport device according to the present disclosure in two different configurations in an exploded view.

What is here the upper part of the device, for example, is mounted on a support plate 20 that can move vertically to the guide gap or clamping of the cable K. This support plate 20 is stabilized in all other spatial axes by suitable guides or linkages. The vertical motion may either be initiated by the upper drive shaft 15a or may take place via a separate drive, e.g., which acts on the tongue 20a of the support plate 20. In both the upper and lower guide and transport device, the drive shaft 15 that rotates during operation is mounted in a deep groove ball bearing 37, that is built into the support plate 20. The large primary roller 30 is fastened to the drive shaft 15 with the adjusting screw 32. The large primary roller 30 is preferably toothed and provided with an internally toothed, coated or uncoated toothed belt 31 having an identical tooth geometry. The small secondary roller 36 participates in this toothed belt drive as a driven wheel. The small secondary roller 36 also used for tensioning the toothed belt 31 is mounted on a non-rotating bolt 38, that is preferably pressed into a tensioning carriage 33 that is a support element that lies in the support plate 20 abutted against from below. The belt 31 is tensioned via the tensioning carriage 33 with the belt tensioner 22, in which the latter is horizontally shifted. The tensioning carriage 33 is fixed relative to the support plate 20 by tightening the fixing screw 35.

The lower part of the guide and transport device in FIGS. 5A and 5B is erected on a support plate 21, that may be fixed in place, but also move in preferably the same plane, similarly to the upper support plate. However, the vertical motion takes place oppositely to that of the upper support plate 20, so that the cable K may be tensioned or released, or the device can be adapted to various cable diameters or cable cross sections.

In principle, the structural design of the lower part of the guide and transport device according to the invention on FIG. 5A is preferably identical to the opposing part in relation to the guide gap S for the cable K. The tensioning carriage 34 can here also be a part identical to 33. However, the tensioning carriage 34 could also be asymmetrical in design for reasons of space and stiffness. In terms of space, the problem lies in the fact that the upper and lower part of the device according to the invention must be moved in close proximity to each other for thin cables, while on the other hand the bending moment of inertia requires a minimal height for the tensioning carriage 33, 34 so as to absorb the forces from the clamping of the cable on the small secondary roller 36.

In the version of the device according to FIG. 5A, the large primary roller 30, belt 31 and tensioning carriage 33 or 34 with the secondary roller 36 mounted thereon are removed to yield the roller drive according to the top configuration on FIG. 4. The belt tensioners 22 now lying loosely in the support plates 20 are also removed. Drive rollers with the same geometry are mounted directly onto the upper drive shaft 15a and lower drive shaft 15b, but preferably differ in design with respect to the coating. The adjusting screws 32 are used to attach these drive rollers, but also the large primary rollers 30.

FIG. 5B shows the guide and transport device on FIG. 5B in a converted configuration corresponding to that of a short-mode kit, as depicted on FIG. 2, or in the last line on FIG. 4. To this end, the carriages 33, 34 acting as support elements for the small secondary rollers 36 are disassembled, and reintegrated in the opposite orientation. Any guide sleeve 3 provided in proximity to the guide and transport device must here also be disassembled, since the small secondary rollers 36 come to lie in this space after conversion into the arrangement according to FIG. 5B, and the cable K is directly held between the small secondary rollers 36 and the belts 31 instead of the guide 3.

For purposes of the conversion of a version according to FIG. 5a into another version according to FIG. 5b, the large primary rollers 30 are turned one after the other on the axes 15a and 15b in such a way that the fixing screws 35 lying behind the rollers may be accessed from the front with a corresponding tool, preferably through boreholes 30a in the large primary rollers 30. The fixing screws 35 of the tensioning carriages 33 and 43 are completely untightened. The two tensioning carriages 33 and 34 are removed. The two large primary rollers 30 are turned one after the other on the axes 15a and 15b in such a way that the belt tensioners 22 lying behind the rollers 30 can be accessed on the left side of the support plates 20 and 21 (FIG. 5a). The belt tensioners 22 are then removed and inserted into the right boreholes (FIG. 5b) of the support plates 20 and 21 provided for this purpose, after the primary rollers 30 have been brought into the position that releases the corresponding boreholes.

If symmetrical in design, the tensioning carriages 33 and 34 can now be positioned on the same support plate 20 or 21 turned by 180°, and fixed in place with the fixing screws 35 so as to allow them to still slide in the support plate 20 or 21. For asymmetrically designed tensioning carriages 33, 34, the latter must be exchanged and secured, as depicted on FIG. 5B. In other words, the previously upper tensioning carriage 33 is now positioned in the lower support plate 21, and the previously lower tensioning carriage 34 is positioned in the upper support plate 20.

After the belt 31 has been mounted, the belts are tensioned one after the other by turning the belt tensioners 22 through exposure to the resultant horizontal displacement of the tensioning carriages 33 and 34, and fixed in place with the fixing screws 35.

Turning to FIG. 6, the advantage to the additional version of a guide and transport device as disclosed herein and depicted in FIGS. 6A-6D is that all partial arrangements of the device, that is, the upper and lower partial arrangements along with those provided on any side of the actual processing device, may be identical in design. Except when in the roller drive configuration (top line of FIG. 4), the guide and transport devices are identical in design, and thus may be converted in an even simpler manner into the other configurations according to FIG. 4.

Figure 6A:
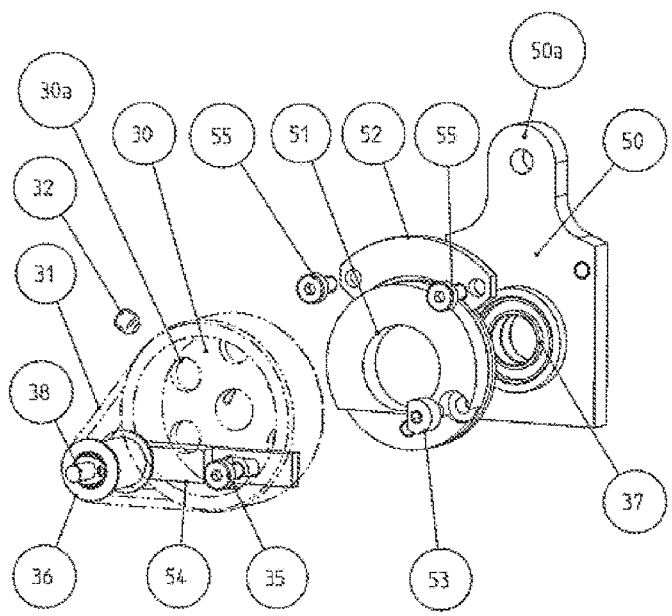
FIG. 6A is an exploded view of a second exemplary version of a cable transport device in a first configuration; and, FIGS. 6B-6D depict the cable transport device of FIG. 6A in three different configurations.
Figure 6A:
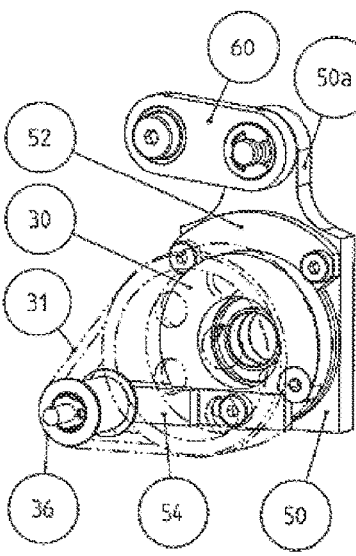
Figure 6A:
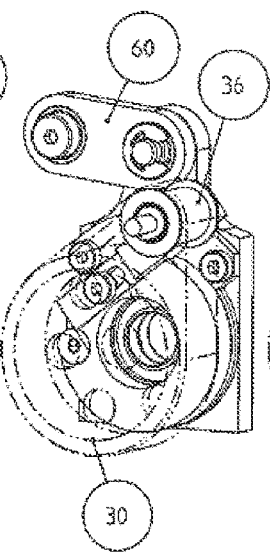
Figure 6A:
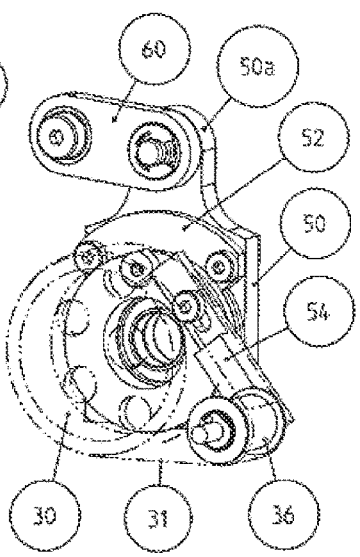

The upper part of the device according to FIG. 6A is erected on a support plate 50, that preferably can move vertically to the clamping of the cable. Guides, hinged joints or similar arrangements keep this support plate stable in all other spatial axes. The vertical motion may be effected either by an upper drive shaft (not shown) that acts on the large primary roller 30 through the deep groove ball bearing 37, or by a separate drive that grips the bracket 50a of the support plate 50, for example with a pivot lever 60 (see FIG. 6B to 6D). The large primary roller 30 is fastened to the drive shaft with the adjusting screw 32. The toothed large primary roller 30 and small secondary roller 36 here again preferably have tensioned on them an internally toothed, coated or uncoated toothed belt provided with an identical tooth geometry.

The bolts 38 for mounting the small secondary roller 36 are pressed onto a tensioning carriage 54 that functions as a support element in versions according to FIGS. 6A-6D. The latter is fastened from below in a rotary flange 51, wherein the belt 31 is tensioned via the tensioning carriage 54 with the belt tensioner 53, on which the tensioning carriage 54 is horizontally displaced. The tensioning carriage 54 is fixed relative to the rotary flange 51 by tightening the locating screw 35.

The rotary flange 51 is mounted on the support plate 50 in such a way that it can be rotated around the central axis of the large primary roller 30, but is fixed in place in all other spatial axes. The rotary flange 51 is fixed in place relative to the support plate 50 by tightening the screws 55 of the gripping yoke 52. As may be readily understood, the herelower, opposing part of the guide and transport device is mirrored around a preferably horizontally lying plane that contains the guide gap S, but otherwise has an identical structural design.

In order to adjust the exemplary version of the device described in reference to FIGS. 6A-6D between the lower three configurations indicated in FIG. 4, the rotary flange 51 can be twisted after the gripping bridge 52 has been loosened by untightening the screws 55, as a result of which the small secondary roller 36 is selectively pivoted into any of the positions as shown in FIG. 6B, 6C, or 6D.

When using a device configured according to FIG. 6A in a cable processing system as schematically depicted on FIG. 4, on the right side of the actual processing device 2, 8, FIG. 6B represents a short-mode kit configuration, while FIG. 6D represents a roller drive type of configuration but with the belt 31 in contact with the cable K, and FIG. 6D represents a configuration corresponding to a conventional belt drive.

For purposes of fixation at any of the three positions depicted in FIGS. 6B-6D for the rotary flange 51, and hence for the small secondary roller 36, the screws 55 are again tightened, so that the rotary flange 51 is fixed in place via the gripping bridge 52.

If necessary, a drive roller with a corresponding coating or surface quality may also be mounted without providing a belt or small secondary roller. To this end, the belt 31 and primary roller 30 must first be removed, and the rotary flange must be brought into a position according to FIG. 6C.

Thus, a guide 3 may be provided here as well, between the respective transport unit in its roller drive or belt drive configuration (FIGS. 6C-6D), to guide the cable K into the transport unit. The guide 3 is removed in the short-mode configuration, because the small secondary rollers 36 come to lie in its location, and the cable K is held directly between the small secondary rollers 36 and/or the belt 31.

The large primary roller 30 is turned in such a way that the screws 55 may be accessed with a tool through the boreholes in the primary roller 30.

Integration into the cable processing system takes place in the same way as described in conjunction with FIG. 4 as well as FIGS. 5A and 5B.

Finally, it should be noted that within the present text, the term "comprising" does not exclude other elements or features, and that use of the terms "a" or "an" does not necessarily exclude a plurality, in the sense that singular reference of an element does not exclude the plural reference of such elements. The verb 'comprise' and its conjugations do not exclude the presence of elements or steps other than those listed in any claim or the specification as a whole. The mere fact that certain features may be recited in mutually different dependent claims does not necessarily indicate that a combination of these features cannot possibly be used to advantage. Furthermore, features described in association with different versions may possibly be combined. It should be noted that the above-mentioned examples, and versions illustrate rather than limit the invention, and that those skilled in the art will be capable of designing, and thus will be placed in possession of, alternative implementations without departing from the scope of the invention as defined by the appended claims. As equivalent elements may be substituted for elements employed in claimed invention to obtain substantially the same results in substantially the same way, the scope of the present invention is defined by the appended claims, including known equivalents and unforeseeable equivalents at the time of filing of the present application. Thus, in closing, it should be noted that the invention is not limited to the abovementioned versions and exemplary working examples. Further developments, modifications and combinations are also within the scope of the appended patent claims and are placed in the possession of the person skilled in the art from the present disclosure. Accordingly, the techniques, systems, and structures described and illustrated previously herein should be understood to be illustrative and exemplary, and not necessarily limiting upon the scope.

LIST OF REFERENCE LABELS 1a, 1b Large primary rollers
2 Cable processing device
3 Guide sleeve
4a, 4b Small secondary rollers
5a, 5b Belt
6a, 6b Large second rollers
7a, 7b Pinch rollers
8 Pivotable guide tube
15a, 15b Upper drive shaft, Lower drive shaft
20 Upper support plate
20a Tongue of support plate
21 Lower support plate
22 Belt tensioner
30 Large primary rollers
30a Boreholes in large primary rollers
31 Belt
32 Adjusting screw
33 Tensioning carriage
34 Tensioning carriage
35 Fixing screw
36 Small secondary rollers
37 Deep groove ball bearing
38 Bolt for secondary rollers
50 Support plate
50a Bracket of the support plate
51 Rotary flange
52 Gripping bridge
53 Belt tensioner
54 Tensioning carriage
55 Fixing screw 60 Pivot lever
K Cable
S Guide gap for cable

What is claimed is:

1. A cable processing apparatus comprising:
a first drive roller assembly, said first drive roller assembly including a primary roller mounted to controllably rotate about a first axis to drive cable;
said first drive roller assembly including a secondary roller mounted to rotate about a second axis;
an adjustable mount adjustably mounting, within said first drive roller assembly, said secondary roller relative to said primary roller;
a second drive roller assembly situated opposite to said primary roller, said primary roller and said second drive roller assembly accommodating a cable transport path therebetween;
said adjustable mount having a first selectable position situating said secondary roller before said primary roller and along said cable transport path, and said adjustable mount having a second selectable position situating said secondary roller after said primary roller and along said cable transport path.

2. A cable processing apparatus as claimed in claim 1, further comprising:
said adjustable mount having a third selectable position that removes said secondary roller from engagement in said cable transport path.

3. A cable processing apparatus as claimed in claim 1, further comprising:
a support upon which said secondary roller is mounted, said support being selectively fixable among plural discrete positions relative to said primary roller.

4. The cable processing apparatus as claimed in claim 3, wherein:
said support mounts said secondary roller eccentrically relative to said first axis.

5. A cable processing apparatus as claimed in claim 3, further comprising:
a groove located in said first drive roller assembly, said groove receiving said support.

6. A cable processing apparatus as claimed in claim 1, further comprising:
a support upon which said secondary roller is mounted eccentrically relative to said first axis; and,
a rotary flange operatively connected to said support to controllably turn said support, said rotary flange being mounted to pivot around a pivot axis lying parallel to said first axis.

7. A cable processing apparatus as claimed in claim 1, further comprising:
a support upon which said secondary roller is mounted eccentrically relative to said first axis; and,
a rotary flange operatively connected to said support to controllably turn said support, said rotary flange being mounted to pivot around a pivot axis that is coaxial to said first axis.

8. A cable processing apparatus as claimed in claim 1, further comprising:
a support plate operatively connected to said first drive roller assembly to position said first drive roller assembly relative to said second drive roller assembly.

9. A cable processing apparatus as claimed in claim 1, further comprising:
a second primary roller mounted to controllably rotate within said second drive roller assembly;
a second secondary roller mounted to rotate within said second drive roller assembly;
a second adjustable mount adjustably mounting, within said second drive roller assembly, said second secondary roller relative to said second primary roller;
said second adjustable mount having a respective first selectable position situating said second secondary roller before said second primary roller and along said cable transport path, and said second adjustable mount having a respective second selectable position situating said second secondary roller after said second primary roller and along said cable transport path.

10. A cable processing apparatus as claimed in claim 9, further comprising:
said second adjustable mount having a respective third selectable position that removes said second secondary roller from engagement in said cable transport path.

11. A cable processing apparatus comprising:
a first drive roller assembly, said first drive roller assembly including a first primary roller mounted to controllably rotate about a respective first axis to drive cable;
said first drive roller assembly including a first secondary roller mounted to rotate about a respective second axis;
a first adjustable mount adjustably mounting, within said first drive roller assembly, said first secondary roller relative to said first primary roller;
a second drive roller assembly, said second drive roller assembly including a second primary roller mounted to controllably rotate within said second drive roller assembly;
a second secondary roller mounted to rotate within said second drive roller assembly;
a second adjustable mount adjustably mounting, within said second drive roller assembly, said second secondary roller relative to said second primary roller;
said second primary roller being situated opposite to said first primary roller, said first and second primary rollers accommodating a cable transport path therebetween;
said first adjustable mount having a respective first selectable position situating said first secondary roller before said first primary roller and along said cable transport path, and said first adjustable mount having a respective second selectable position situating said first secondary roller after said first primary roller and along said cable transport path;
said first adjustable mount having a respective third selectable position that removes said first secondary roller from engagement in said cable transport path;
said second adjustable mount having a respective first selectable position situating said second secondary roller before said second primary roller and along said cable transport path, and said second adjustable mount having a respective second selectable position situating said second secondary roller after said second primary roller and along said cable transport path; and,
said second adjustable mount having a respective third selectable position that removes said second secondary roller from engagement in said cable transport path.

12. A cable processing apparatus as claimed in claim 11, further comprising:
a first support upon which said first secondary roller is mounted, said first support being selectively fixable among plural discrete positions relative to said first primary roller.

13. A cable processing apparatus as claimed in claim 12, further comprising:

a groove located in said first drive roller assembly, said groove receiving said first support.

14. A cable processing apparatus as claimed in claim 12, further comprising:
a second support upon which said second secondary roller is mounted, said second support being selectively fixable among plural discrete positions relative to said second primary roller.

15. The cable processing apparatus as claimed in claim 14, wherein:
said first support mounts said first secondary roller eccentrically relative to said first axis; and,
said second support mounts said second secondary roller eccentrically relative to an axis of said second primary roller.

16. A cable processing apparatus as claimed in claim 11, further comprising:
a support upon which said first secondary roller is mounted eccentrically relative to said first axis; and,
a rotary flange operatively connected to said support to controllably turn said support, said rotary flange being mounted to pivot around a pivot axis lying parallel to said first axis.

17. A cable processing apparatus as claimed in claim 11, further comprising:
a support upon which said first secondary roller is mounted eccentrically relative to said first axis; and,
a rotary flange operatively connected to said support to controllably turn said support, said rotary flange being mounted to pivot around a pivot axis that is coaxial to said first axis.

18. A cable processing apparatus as claimed in claim 11, further comprising:
a first support upon which said first secondary roller is mounted eccentrically relative to said first axis;
a second support upon which said second secondary roller is mounted eccentrically relative to an axis of said second primary roller;
a first rotary flange operatively connected to said first support to controllably turn said first support; and,
a second rotary flange operatively connected to said second support to controllably turn said second support.

19. A cable processing apparatus as claimed in claim 11, further comprising:
a first support plate operatively connected to said first drive roller assembly to position said first drive roller assembly relative to said second drive roller assembly.

20. A cable processing apparatus as claimed in claim 19, further comprising:
a pivot lever operatively connected to move said first support plate.

* * * * *